United States Patent [19]

Marks

[11] Patent Number: 5,615,364
[45] Date of Patent: Mar. 25, 1997

[54] APPARATUS AND METHOD FOR PERFORMING THE BACKUP OF A PRIMARY DATABASE USING A BACK UP DATABASE

[75] Inventor: David J. Marks, Johnson City, Tenn.

[73] Assignee: Siemens Energy & Automation, Inc., Alpharetta, Ga.

[21] Appl. No.: 499,121

[22] Filed: Jul. 6, 1995

Related U.S. Application Data

[63] Continuation of Ser. No. 961,752, Oct. 16, 1992, abandoned.

[51] Int. Cl.⁶ .................................................. G06F 17/30
[52] U.S. Cl. .................... 395/618; 395/182.04; 395/620; 364/DIG. 1; 364/282.1; 364/285.3
[58] Field of Search .................... 395/200.03, 200.09, 395/182.04, 182.13, 600

[56] References Cited

U.S. PATENT DOCUMENTS

| | | | |
|---|---|---|---|
| 4,751,702 | 6/1988 | Beier et al. | 395/600 |
| 4,958,270 | 9/1990 | McLaughlin et al. | 395/600 |
| 5,093,782 | 3/1992 | Muraski et al. | 364/187 |
| 5,138,710 | 8/1992 | Kruesi et al. | 395/575 |
| 5,155,678 | 10/1992 | Fukumoto et al. | 395/425 |
| 5,170,480 | 12/1992 | Mohan et al. | 395/600 |
| 5,276,871 | 1/1994 | Howarth | 395/600 |
| 5,379,418 | 1/1995 | Shimazaki et al. | 395/600 |

FOREIGN PATENT DOCUMENTS

0460308A1 12/1991 European Pat. Off. .
0477123A2 3/1992 European Pat. Off. .

*Primary Examiner*—Thomas G. Black
*Assistant Examiner*—John C. Loomis
*Attorney, Agent, or Firm*—Donald M. Boles

[57] ABSTRACT

A Redundant Networked Database System is taught. Briefly stated, Control System Computers are designated for primary and backup database operation with applications being inputable to either primary or backup. Upon changes to the database, the primary and backup communication agents communicate with each other and to automatically update the backup. In this fashion, the primary and backup databases are automatically synchronized without manual intervention or the need for reinputting of the changes to the backup database.

8 Claims, 3 Drawing Sheets

PRIMARY COMMUNICATIONS AGENT STATE DIAGRAM

PRIMARY COMMUNICATIONS AGENT STATE DIAGRAM

APPARATUS AND METHOD FOR PERFORMING THE BACKUP OF A PRIMARY DATABASE USING A BACK UP DATABASE

CROSS-REFERENCE TO RELATED APPLICATION

This is a continuation of Ser. No. 07/961,752 filed Oct. 16, 1992 now abandoned.

FIELD OF THE INVENTION

This invention relates, generally, to control systems and more particularly to a control system having automatic database redundancy.

BACKGROUND OF THE INVENTION

It is known that the use of computers in a manufacturing environment is increasing at an ever accelerating rate. Whereas it was previously common to install one or two computers which interacted with remote peripheral sensors and the like, there is an increasing tendency to utilize computers, generally in the form of microprocessors, as close as possible to the events or environment being sampled or controlled.

Accordingly, along with this proliferation of computers there is now the need to network them so as to form a distributed control system. One distinct advantage with distributed processing is the desirability and ability to switch to a backup when, for example, the network or a primary computer goes down or malfunctions.

It is therefore important to have as much information on the secondary computer as the primary so that it can generally perform its function without interruption. Unfortunately, with the increasing use of computers, changes are made to the system on a much more pervasive and frequent basis.

Heretofore, backup databases, those databases which were used in the event of a primary system failure, were run in synchronization with essentially identical equipment running both copies in similar environments. Modifications to one database however, generally had to be made to the other databases and required at least some manual intervention. Accordingly, this required that all modifications had to be done at least twice. This is particularly problematic when complex modifications need to be done which thereby results in tedious duplicative work. Moreover, the chance of an error or discrepancy between the backup and primary databases was greatly increased.

There are a number of schemes which have tried to manage a network type system. One such example may be founded in U.S. Pat. No. 5,093,782 "Real Time Event Driven Database Management System" to Muraski et. al., issued Mar. 3, 1992 which attempts to speed up and simplify a database system. However, these systems generally require specialized hardware, unique architecture and the like and are therefore generally not "retrofitable" to existing systems.

Accordingly, it is advantageous and an object of the present invention to keep primary and backup databases synchronized without manual intervention. It is also desirable and yet another object of the present invention to produce a system which allows for hardware or network failure by one portion of the system without affecting the remaining portions.

It is still a further object of the present invention and is also desirable to produce a system which effectively allows for two or more different computers to have effectively identical databases while still allowing for communication between the two.

Still a further object of the present invention is to produce a redundant system which makes the backup database invisible or transparent to the user and which automatically accomplishes synchronization without any special effort on the part of the user.

It is also advantageous and another object of the present invention to produce a redundant network database system, comprising at least two computers, a communication link disposed between them so as to allow communication between the two computers and a means for sensing a change to a database and producing an indication thereof and a communications means for sensing the indication produced by the first means whereby the communication means updates the database of the remaining at least two computers.

DESCRIPTION OF THE DRAWINGS

Reference may be now had to accompany drawings in which.

DETAILED DESCRIPTION OF THE PREFERRED EMBODIMENT

Figure 1:
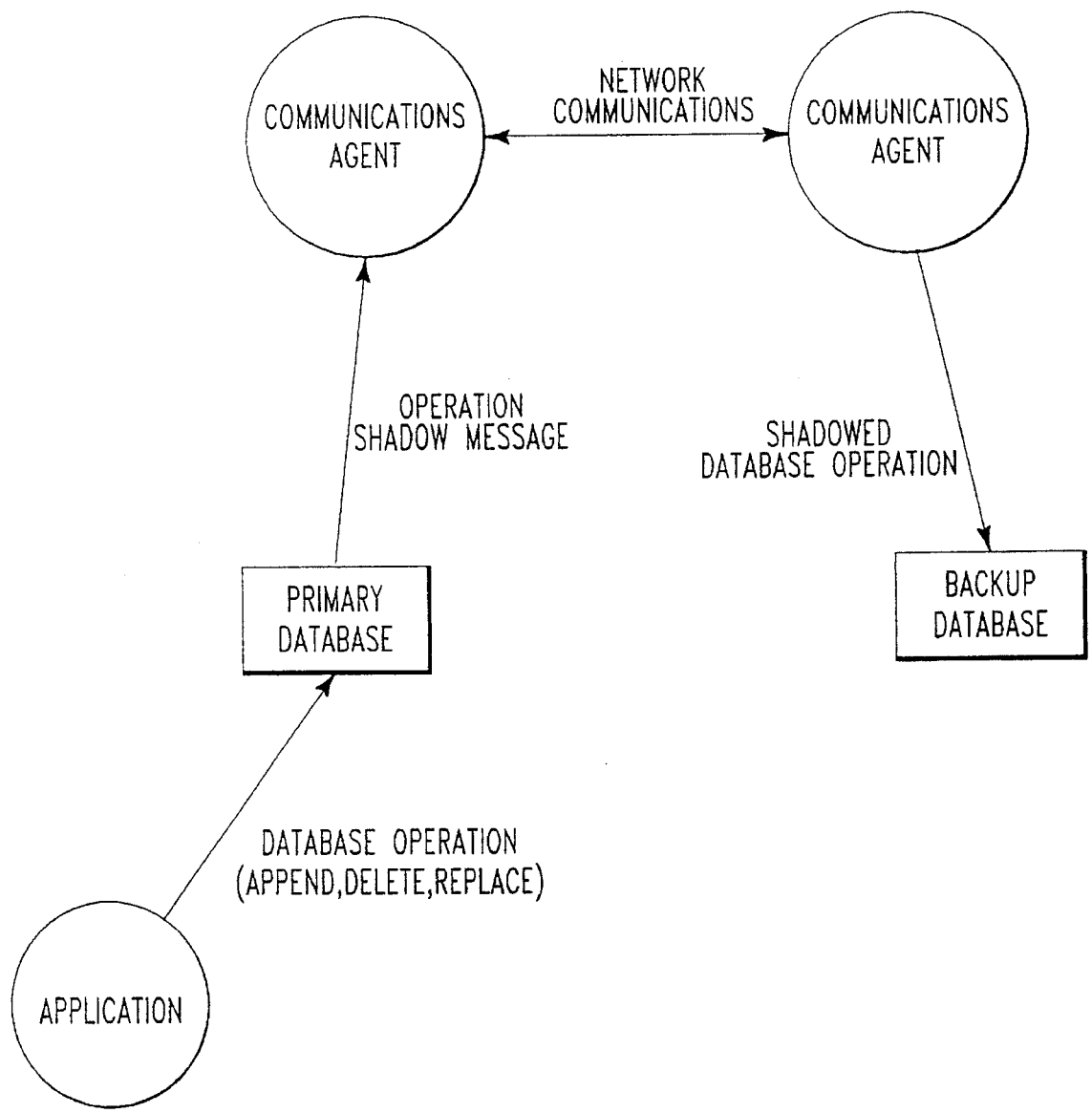
FIG. 1 is a block diagram of the network as envisioned by the present invention.

Referring now to FIG. 1 there is shown a block or function diagram of the present invention. It is to be understood that in the preferred embodiment of the present invention the within communication database is used in conjunction with a Networked Control System although it is to be understood that other types of networks may be utilized without departing from the spirit and scope of the present invention. Such other types of networks may be, for example, computers on a local area network.

Here there is shown the preferred embodiment using two computers each of which incorporates a Primary Database and a Communications Agent. It is to be understood that although only two computers are shown for ease of understanding and illustration purposes, more computers may be used. Accordingly, a network would encompass substantially more computers although they would operate substantially identical to the manner described below. Shown is the Primary Database having a Communications Agent (as described more fully below) integrated therewith and a Backup Database also having a Communications Agent integrated therewith.

An application source acting on the database is also shown as being operatively connected to the Primary Database, although such sources may be operatively connected to any of the Backup Databases. Such applications may be, for example, in the form of an updated process or process control information which has been provided by external input devices or sensors, recorded process variables or any other information relevant to the operation being monitored or controlled by the network system.

Each database runs on its own computer with the communication agent being a resident database package which is also run on each computer. This communications agent package, as described in fully below, provides communications between the databases. By way of overview, whenever an application program (such as a database shall) cause a modification to the primary database, a message is sent from the database to the local communications agent. The communications agent thereby in turn forwards that message to the remote communication agent, in this case the communication agent resident with the backup database. The remote communication agent thereby upon receipt of this message performs that same operation on the backup database.

In the preferred embodiment of the present invention, communications is in both directions as is normally the case with control system networks. Therefore, should a malfunction occur in the primary database or in the primary database's computer, the backup database can take over until the primary is functioning again. Therefore, the former backup is now in the role of primary and can store all database modifications for later transmittal to the former primary. In this fashion, it is not necessary for applications interacting with the network to be postponed or delayed until the primary system is functioning.

Two kinds of failures are detected and acted on by the present invention; database operation failure and network failure. When a database operation fails on the primary computer, the primary computer's database logs an error. The result is that this shadowing is effectively ceased since the operation failed and was not performed. However, if a database operation should fail during a shadowed transaction (that is, where database exchanges are actually taking place) the transaction is generally rolled back which in turn causes the corresponding transaction on the backup computer to also be rolled back. Accordingly, the failed operation (update, delete or insert) is itself not shadowed.

Should a database operation fail on the backup computer it is automatically logged on the backup. Since, during normal operation it is common to expect that the user is not generally paying attention to the backup, a message is automatically sent to the primary computer so that the failure will also be reported to the primary computer. This therefore allows users or other programs on the primary computer to decide what to do in a predetermined fashion. Depending upon what is desired by the user or the resident programs, it is therefore possible that the two databases will no longer be synchronized. In any event however, the database operation failure will have been at least noted.

The second type of failure, network failure when detected on the primary computer automatically causes the connection between the primary and backup database to be shutdown. The primary computer thereafter waits for a reconnection with the backup. Accordingly, any database operations that come in during this time are queued for later transmission to the backup. Therefore when communications are reestablished, transactions that were in progress are resent, followed by the mentioned queued pending operations.

Should the backup computer detect a failure of the network, the backup computer automatically rolls back any transactions in progress to avoid keeping any files/tables locked on the backup computer. The main reason for this is that when communications is reestablished, it is highly unlikely that any corresponding transactions will remain in progress with the result that there would be no convenient way to tell the backup computer to unlock the files/tables. Thereafter, when communications are reestablished, the backup computer goes back to a waiting state for database shadow messages. This automatically causes the primary computer to resend any transactions that were in progress prior to the failure with the result that synchronization is accomplished.

Figure 2:
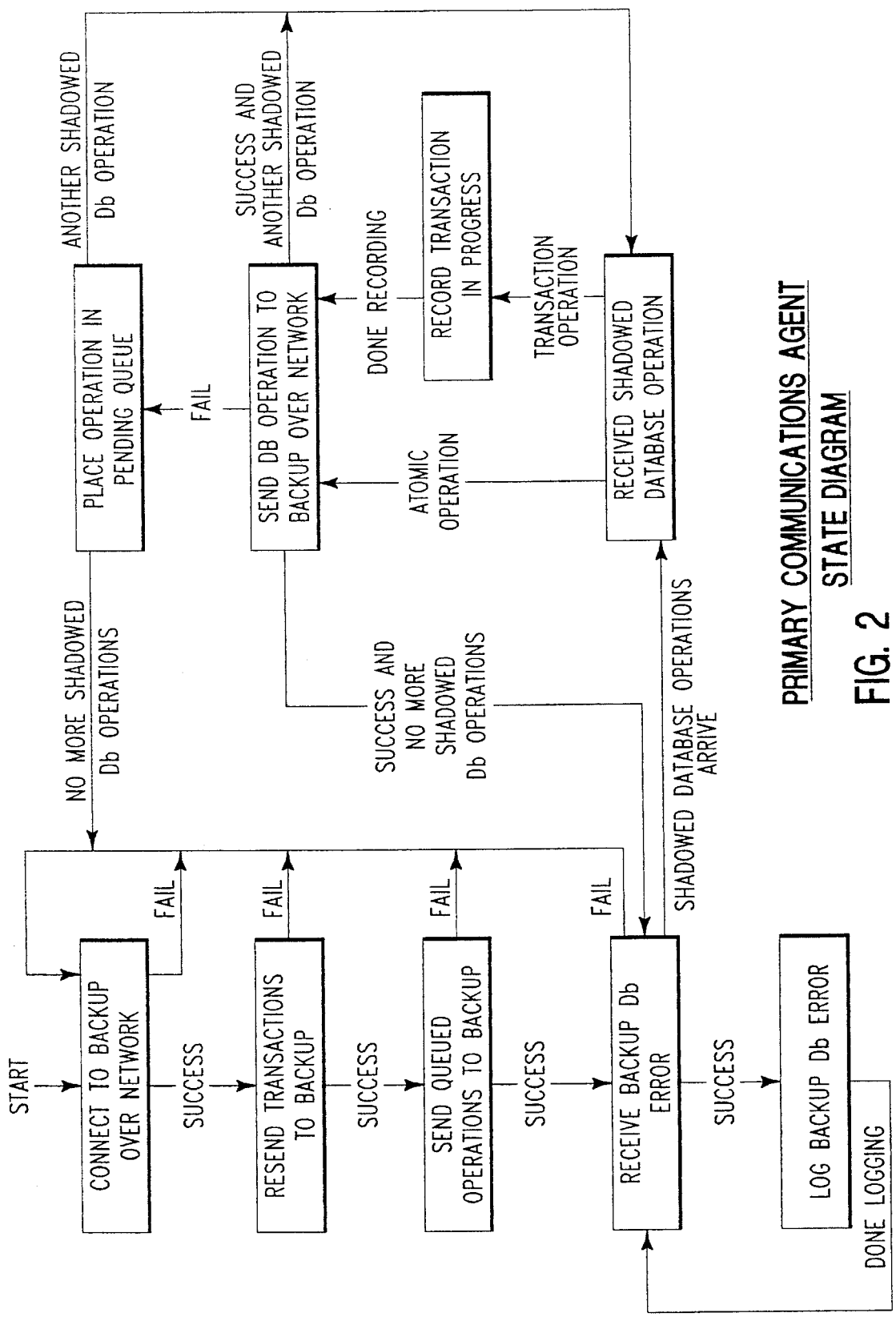
FIGS. 2 and 3 are State diagrams of the Primary and Backup Communications Agent, respectively, of the present invention.
Figure 3:
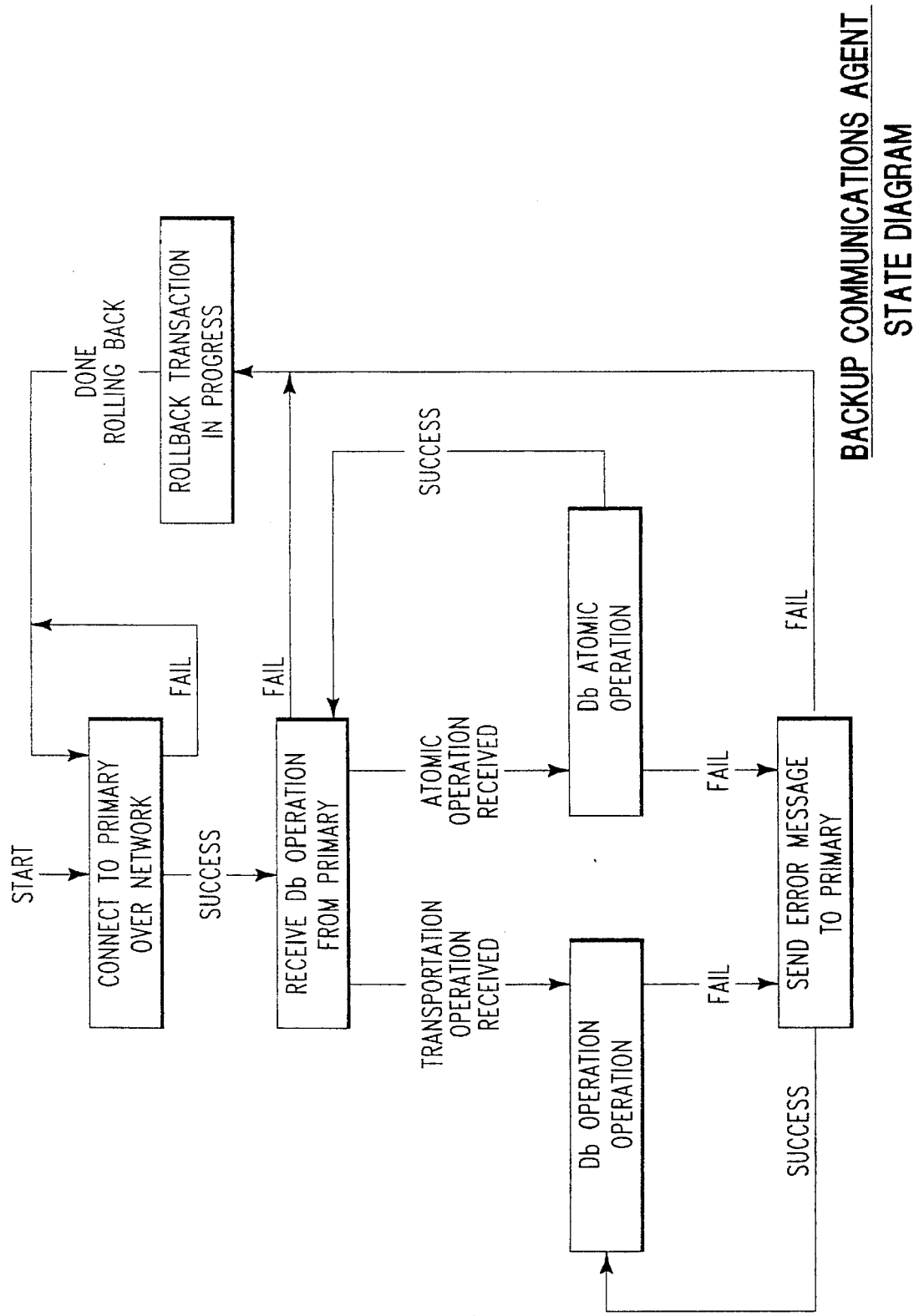

Referring now to FIGS. 2 and 3 there is shown state flowchart diagrams of the primary and backup communication agents respectively. It is to be understood that in the preferred embodiment of the present invention, the operations are performed in the sequence and manner as shown although the order of some steps and the like may be changed without departing from the spirit and scope of the present invention.

The primary and backup state diagrams are shown for the communications agent portion of the present invention. It should be noted that the "START" arrow of each of state diagrams represents start up of the communications agents at boot-up of the control system computers. As can be seen with the primary and backup state diagrams, a connection is initially accomplished between the backup and primary over the network. This connection of course checks for failure conditions. Should a failure condition be detected or exist, the sequence is reinitiated. Additionally, with respect to the primary communication agent shown in FIG. 2, a failure at any point of actual transmission of the database data results in the re-initiation of a connection to the backup over the network.

As can be seen in FIG. 2, database operations are sent to the backup database with acknowledgments sent back to the primary database. This type of handshake is readily known and available to one skilled in the art and ensures the existence and integrity of successful communication.

It is recognized that in database systems as envisioned by the present invention, two types of changes to the database are generally accomplished. These changes are in the form of an atomic operation or a transaction operation. A transaction operation is one in which particular files or portions of the database are locked out to external changes unless and until the file is unlocked. This type of operation is generally done when extensive or substantial changes are being made to the database. Conversely, an atomic operation is generally one which is automatic, and relatively minor in breadth. In any event, the success of this transmission is again checked to ensure its integrity.

With respect to FIG. 3 it can be readily seen how the communication agent receives and processes the information from the primary database. Of particular import is its operation during and just after failure. Accordingly, in the event of communications failure, its previously mentioned roll back of any transactions in progress takes place whereby the new information or data is ignored and the integrity of the database is in effect rolled back to just as it was prior to the failure. In this manner, the backup database can reinitiate or continue from a known correct point, thereby enabling it to operate or act as a primary database for backing up the formerly primary database.

Accordingly, the backup communications are synchronized to the primary without any manual initialization or reinputing of any data. Further, since the communication link is a two-way path, complete bi-directional database synchronization is accomplished.

It is to be understood that the present invention may be modified without departing in spirit and scope thereof and that its breadth not be limited by the specific embodiments but rather only limited by the claims appended hereto.

What is claimed is:

1. A method for automatic redundant network database management having at least two control system computers, a primary computer and a backup computer each of which has a database, said computers interconnected in a network, comprising the steps of:

(A) initiating communication between said primary and backup computers;

(B) communicating from each one of said primary and backup computers to the other of said primary and backup computers each change in the database associated with said one computer individually, for shadowing said change in said database of said one computer;

(C) automatically updating the database of the other of said primary and backup computers with the changes made to the said one database;

(D) discontinuing the communication between said primary and backup computers upon a detection by said primary computer of a failure of said network;

(E) rolling back a shadowed transaction in progress in said backup computer when said communication is discontinued;

(F) queuing, in said primary computer database, changes to the primary database upon said detection of the failure of said network; and (G) transmitting, from said primary computer, said queued database changes to said backup computer, upon reestablishing of communications in said network.

2. A method according to claim 1 comprising the additional step of:

(1) logging an error condition in the primary computer's database upon detecting a failure of a primary database operation.

3. A method according to claim 2, comprising the additional step of:

(2) rolling back the change to the backup computer database upon detection of a failure of a primary computer database operation.

4. A method according to claim 1 comprising the additional step of:

(1) transmitting an error condition from said backup database computer to said primary computer database upon said backup computer detecting a database operation error.

5. A system for backing up a primary database, comprising:

a first computer having means for storing the primary database and a second computer, having means for storing a backup database;

network means for connecting said first computer and said second computer;

first means disposed in said first computer for producing a message indicating a change to said primary database and second means in said second computer for producing a respective message indicating each change in said backup database, individually;

communication agent means disposed in said first computer and in said second computer, responsive to the respective messages produced by said first and second means, whereby any changes to said primary database are communicated to said backup database over said network for shadowing said change in said primary database; and means for discontinuing the communication between said first and second computers upon a detection by said first computer of a failure of said network;

said second computer including means for rolling back a shadowed transaction in progress when said communication is discontinued;

said first computer including means for queuing changes to the primary database upon said detection of the failure of said network;

said first computer including means for transmitting said queued database changes to said second computer, upon reestablishing of communications in said network.

6. A device according to claim 1 wherein said communication link is bidirectional such that any changes to said backup database are automatically transmitted to said primary database.

7. A system according to claim 5, wherein:

said second computer enters a waiting state when communications are reestablished in said network; and said first computer transmits said transaction in progress and said queued transactions to the second computer in response to said waiting state.

8. A system according to claim 5, wherein said communications agent means are separate from said first and second databases.

* * * * *